Patented July 4, 1933

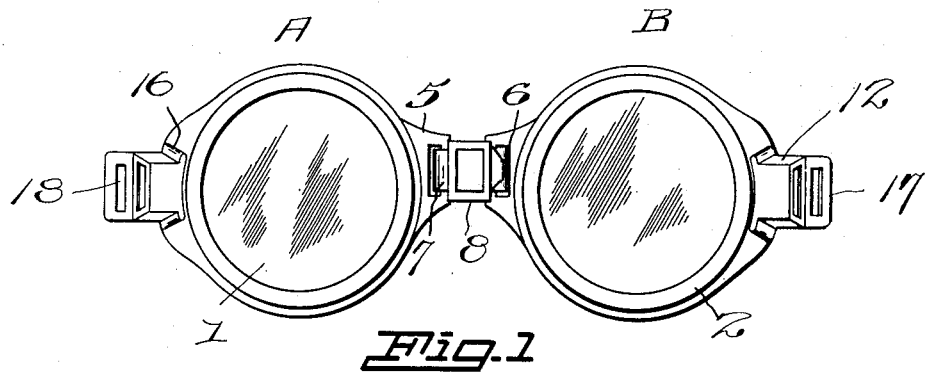
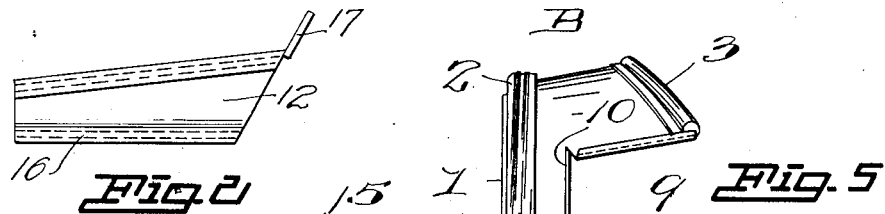
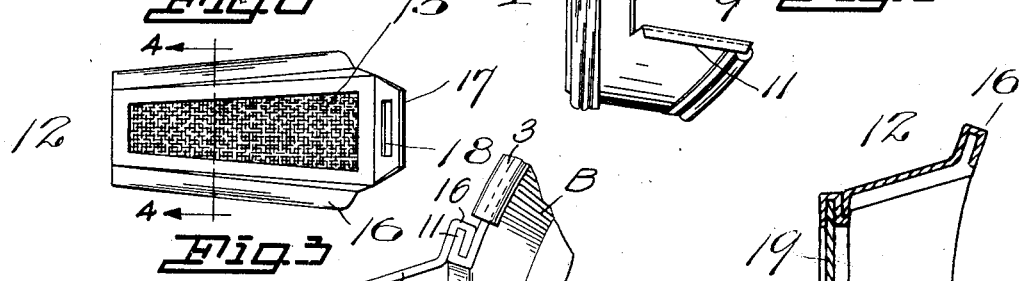

1,916,630

UNITED STATES PATENT OFFICE

JOHN L. MORAN AND ALVIN J. LEE, OF SPOKANE, WASHINGTON, ASSIGNORS, BY DIRECT AND MESNE ASSIGNMENTS, OF ONE-FOURTH TO FRANCIS E. P. WILDER, OF SPOKANE, WASHINGTON, AND ONE-FOURTH TO ROBERT MALCOM, OF CHICAGO, ILLINOIS

GOGGLES

Application filed May 28, 1930. Serial No. 456,507.

Our present invention relates to improvements in goggles of the type employed by mechanics, machinists, and others when working with welding torches, abrading wheels, and while working under other conditions that may result in injury to the unprotected eyes, or that may result in injury or damage to the lenses of spectacles that are worn by the user of the goggles. Thus the primary object of our invention is the provision of a pair of goggles to be worn by a person, who of necessity, is compelled to habitually wear eyeglasses or spectacles, and the purpose of our goggles is not only to protect the eyes of the wearer but also the eyeglasses worn by the wearer of the goggles.

As is well known, the flying particles from a grinding stone, abrading wheel, or other similar article, frequently mar, scratch, and break the lenses of the eyeglasses or spectacles worn by workmen and artisans, and as the lenses of the spectacles are usually costly, the wearer of the spectacles is put to an expense in replacing the marred lenses. By the use of the protecting goggles of our invention, in which goggles we employ comparatively cheap lenses, the damage, if any to the lenses, comes to the cheap lenses of the goggles, and these may be replaced at comparatively slight cost.

In carrying out our invention we provide eye cups for the goggles that may be manufactured at comparatively low cost, and insure a simple combination and arrangement of parts whereby the goggles may be supported on the eyeglasses without discomfort and without danger of displacement. In the accompanying drawing we have illustrated one complete example of the physical embodiment of our invention wherein the parts are combined and arranged according to the best mode we have thus far devised for the practical application of the principles of our invention.

Figure 1 is a face view of a pair of goggles according to our invention.

Figure 2 is a top view and Figure 3 is an outer side view of one of the separable or removable temple housings of the cups of the goggles.

Figure 4 is an enlarged, transverse, vertical sectional view at line 4—4 showing the mode of attaching the separable temple-housing to its cup.

Figure 5 is an outer side view of a cup with the separable temple-housing detached to disclose the slotted construction of the cup.

Figure 6 is a sectional detail view, enlarged, of the rim pad or cushion for the cups.

Figure 7 is a vertical sectional view of one of the separable temple housings with an imperforate plate closing its vent opening in lieu of the ventilating screen of Figure 4.

Figure 8 is a rear end view of a temple housing and a portion of the side wall of an eye-cup.

In carrying out our invention we employ the conventional form of eye cups A and B, which in this instance are pressed or stamped from sheet metal, as aluminum, to provide a comparatively light, but sufficiently reinforced structure for the purpose.

The usual lens 1 is secured and retained in the front of each cup by means of an exterior, screw threaded retaining ring 2, and the rear edges of the cups, which conform to the facial contour, are provided with rubber pads 3 attached to the cups by means of the flanges 4, in suitable manner.

A flexible bridge connection is secured between the two cups by means of complementary bridge-flanges 5 projecting from adjoining inner sides of the cups, and these flanges are slotted at 6 to receive the flexible bridge-strap 7 that is provided with a usual adjusting buckle 8.

At their outer sides the cups are each provided with a slot 9 having forwardly tapering walls and open at the rear, the slot being located in the wall at the point of its maximum depth. The front end of the slot, as seen in Figure 5, terminates some distance back of the screw ring 2 and back of the front of the lens-cup. As these slots are designed to accommodate the hinged joints between the frames and the temples or side bars of the spectacle, it will be apparent that this location of the slots insures that the lenses of the spectacles will be behind or back of the lenses of the goggles, and the space between the two sets of lenses will prevent frictional contact between the sets of lenses. At the front of the slot, its wall is turned out to form a stop flange 10, and at the sides of the slot, its tapering walls are turned back at their edges to form guide and retaining grooves, as at 11, for the separable or detachable temple housings 12 that enclose the hinged joints of the temples of the spectacles.

These temple housings are pressed or stamped from sheet metal with an opening in their outer walls, and each housing is crimped, as at 13, to form an inner flange about the opening, while a complementary, outer flange 14 is fashioned about the opening as shown thereby providing a channel on each side of the opening in the housing, open at the large end of the temple housing. The opening is provided for ventilation of the interior of the cups, and a screen or perforated panel 15 is pressed or slid between the crimped flange 13 and the outer flange 14 to close the opening against ingress of flying particles, as from a grinding or abrading wheel.

Along the upper and lower edges of the housings and at their inner open sides, are formed grooved flanges 16 that taper from the rear to the front of the housing, and are designed to slidably engage over the complementary grooved flanges 11 of the slotted cups.

The rear open ends of the housings are slipped over the front smaller or narrower tapered guide flanges 11, and then the housings are slid to the rear until the front closed end of the housing contacts with the stop flange 10 of the cup. Thus, when the head-strap for fastening the goggles in place is secured to the attaching flanges 17 by means of the slots 18 in these attaching flanges, the housings are pulled back or retained in position against forward displacement, and the stop flange 10 prevents excessive movement of the housing. The housing is thus held by frictional engagement between the flanges 11 and 16, and by the stop flange 10, and the housings become rigid parts of the cups and afford anchoring means for the ends of the strap that is fastened back of the head for the goggles.

In Figure 7 the vent opening of the housing is closed by a slide plate 19 that is used in some instances in lieu of the perforated vent screen 15 of Figure 4. In marketing the goggles, the imperforate plate 19 may be sold with the goggles, and the wearer of the goggles may substitute the perforated panel or screen 15 if desired by simply sliding the imperforate plate or transparent element 19 toward the inner enlarged end of the housing 12 and inserting the narrower end of the panel or screen 15 into the channel at the large end of the housing.

Having thus fully described our invention, what we claim as new and desire to secure by Letters Patent is:

In goggles of the character described, adapted for use with spectacles, provided with a pair of eye-cups flexibly secured together, having side walls increasing in width toward the outer temple sides thereof and lens-seats at the forward ends of the eye-cups; the outer temple side wall of each eye-cup being partially cut away from a point rearward of the lens-seat to the rear end of the cup to provide an elongated opening open at the rear end of the cup, a channeled member adapted to be removably secured across said opening; the opposite longitudinal sides of the opening and the opposite longitudinal edges of said member being formed into complementary portions whereby the member is slidingly held in place, the member at its inner end being provided with an end wall, whereby complete closure of said opening is effected, while the outer end of said member is provided with a slot for attachment of a head band thereto; said member having an opening in its main wall with the opposite marginal edges of said opening being bent into channel formation open at the rear end of the member; and a side vision providing element slidably mounted in said channeled formation of the member.

In testimony whereof we affix our signatures.

JOHN L. MORAN.
ALVIN J. LEE.